US005677665A

United States Patent [19]

Amano et al.

[11] Patent Number: 5,677,665

[45] Date of Patent: Oct. 14, 1997

[54] KEYLESS ENTRY UNIT

[75] Inventors: Nobuhiro Amano, Ebina; Shinobu Machida, Yokohama, both of Japan

[73] Assignee: Nissan Motor Co., Ltd., Yokohama, Japan

[21] Appl. No.: 628,244

[22] Filed: Apr. 4, 1996

[30] Foreign Application Priority Data

Oct. 17, 1995 [JP] Japan .................................... 7-268532

[51] Int. Cl.[6] .................................................... B60R 25/10

[52] U.S. Cl. ........................ 340/426; 340/425.5; 340/457; 307/10.3; 307/10.6; 307/10.2

[58] Field of Search ................................ 340/425.5, 426, 340/457, 825.69, 825.72, 539; 307/10.2, 10.3, 10.6

[56] References Cited

U.S. PATENT DOCUMENTS

| | | | |
|---|---|---|---|
| 4,240,516 | 12/1980 | Henderson | 180/289 |
| 5,438,312 | 8/1995 | Lewis | 340/457 |

*Primary Examiner*—Jeffery Hofsass
*Assistant Examiner*—Julie B. Liew
*Attorney, Agent, or Firm*—Foley & Lardner

[57] ABSTRACT

A judgment is made as to whether an ignition key is inserted into a key cylinder, and when the ignition key is inserted into the key cylinder, a keyless entry operation is forbidden. Here, a judgment is made as to whether a door on a driver's seat side is slammed shut by a driver, and when the door on the driver's seat side is slammed shut, forbiddance of locking/unlocking control is canceled according to a command signal transmitted from a transmitter.

13 Claims, 4 Drawing Sheets

KEYLESS ENTRY UNIT

BACKGROUND OF THE INVENTION

1. Field of the Invention

The present invention relates to a keyless entry unit for locking and unlocking doors of a vehicle according to a command signal, which is transmitted from a portable transmitter and is received by a receiver provided to the vehicle.

2. Description of the Prior Art

As a conventional keyless entry unit, one which is disclosed in Japanese Unexamined Utility Model Publication No. 62-73063/1987 (Jitsukalsho 62-73063) is known as shown in FIG. 1.

In this keyless entry unit, a driver makes a transmitter 111 transmit a door unlocking command signal so as to make a door locking mechanism (door locking/unlocking actuator) 114 perform an unlocking operation, and inserts an ignition key into a key cylinder so as to start the vehicle. When the engine starts, a handle locking switch (HLSW) is turned off. At this time, a relay coil 1151 is not excited, and a relay switch 118s is turned off. Then, supplying of a power source to a receiver 112 is stopped and thus the receiving operation is stopped.

Even if a light signal, which is similar to the door unlocking command signal, is applied to the receiver 112 from the circumference of the vehicle while the vehicle is running with all the doors locked after the engine started in such a manner, the receiver 112 does not receive the light signal so that the entire operating and controlling of the door locking mechanism 114 by a controller 113 is forbidden.

However, in such a conventional keyless entry unit, while the ignition key is in the key cylinder, the operation using the transmitter is forbidden. For this reason, in the case where the door is shut with the ignition key in the key cylinder, there arises a problem that the key is locked up in the vehicle.

SUMMARY OF THE INVENTION

It is an object of the present invention to provide a keyless entry unit which is capable of forbidding an ignition key to be locked up in a vehicle even if a door is shut with an ignition key in a key cylinder.

In order to achieve the above object, there is provided a keyless entry unit of the present invention for locking and unlocking doors of a vehicle according to a command signal which is transmitted from a portable transmitter and is received by a receiver provided to the vehicle. The keyless entry unit is characterized by having a key detecting means for detecting as to whether an ignition key is inserted into a key cylinder provided in the vehicle, a door state detecting means for detecting that the doors of the vehicle are closed and are locked, and a canceling means for when the detection is made that the ignition key is inserted in the key cylinder and the detection is made that the doors of the vehicle are closed and are locked, canceling forbiddance of the locking/unlocking control according to the command signal from the transmitter.

In accordance with the above arrangement, when the detection is made that the ignition key is inserted into the key cylinder and that the doors of the vehicle are closed and are locked, the forbiddance of the locking/unlocking control according to the command signal transmitted from the transmitter is canceled. As a result, an unlocking command signal is transmitted from the transmitter so that the locking state of the doors of the vehicle can be canceled.

For a fuller understanding of the nature and advantages of the invention, reference should be made to the ensuing detailed description taken in conjunction with the accompanying drawings.

DESCRIPTION OF THE PREFERRED EMBODIMENTS

The following describes an embodiment of the present invention by referring to the figures.

Figure 1:
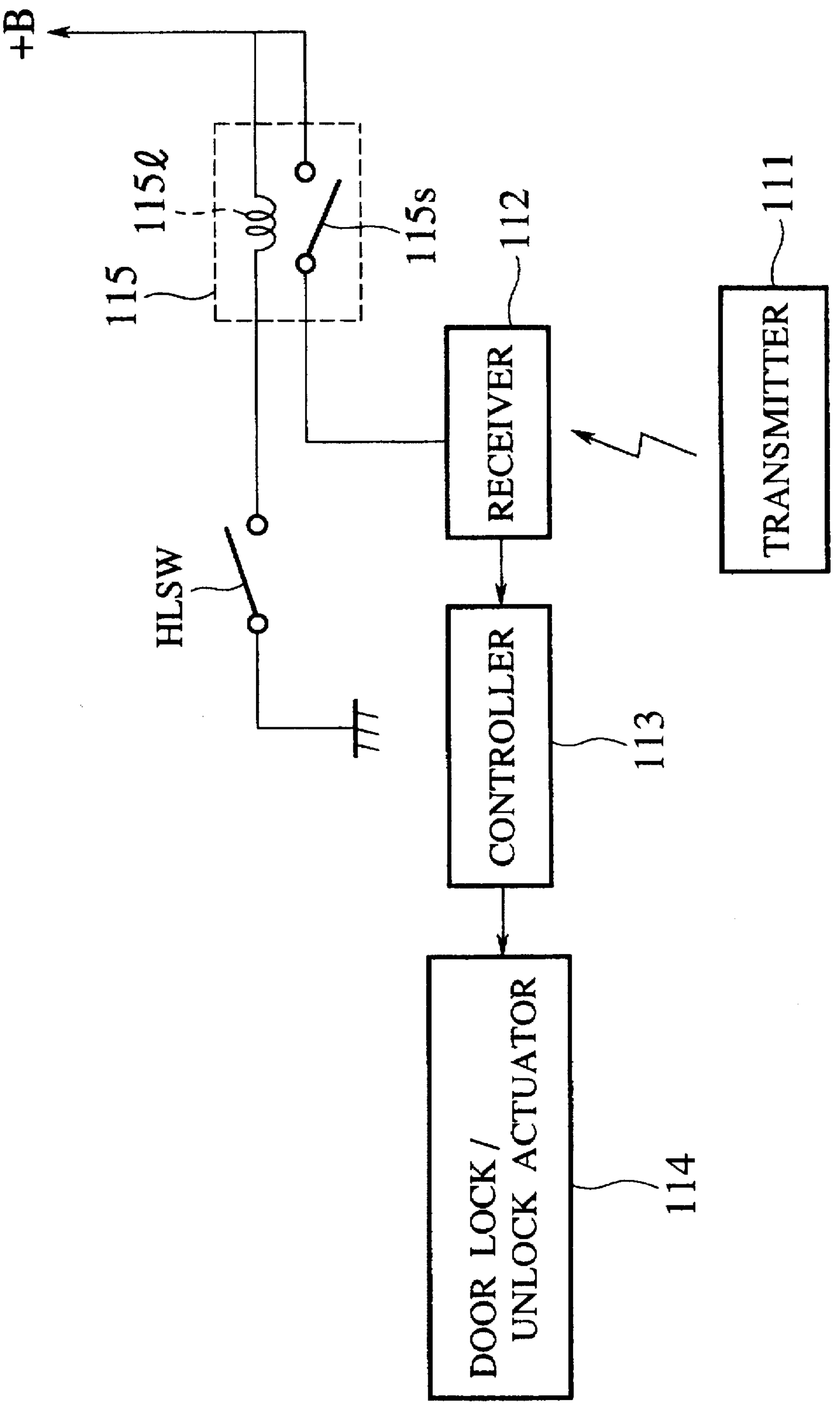
FIG. 1 PRIOR ART
FIG. 1 is a drawing which shows a system arrangement of a conventional keyless entry unit.
Figure 2:
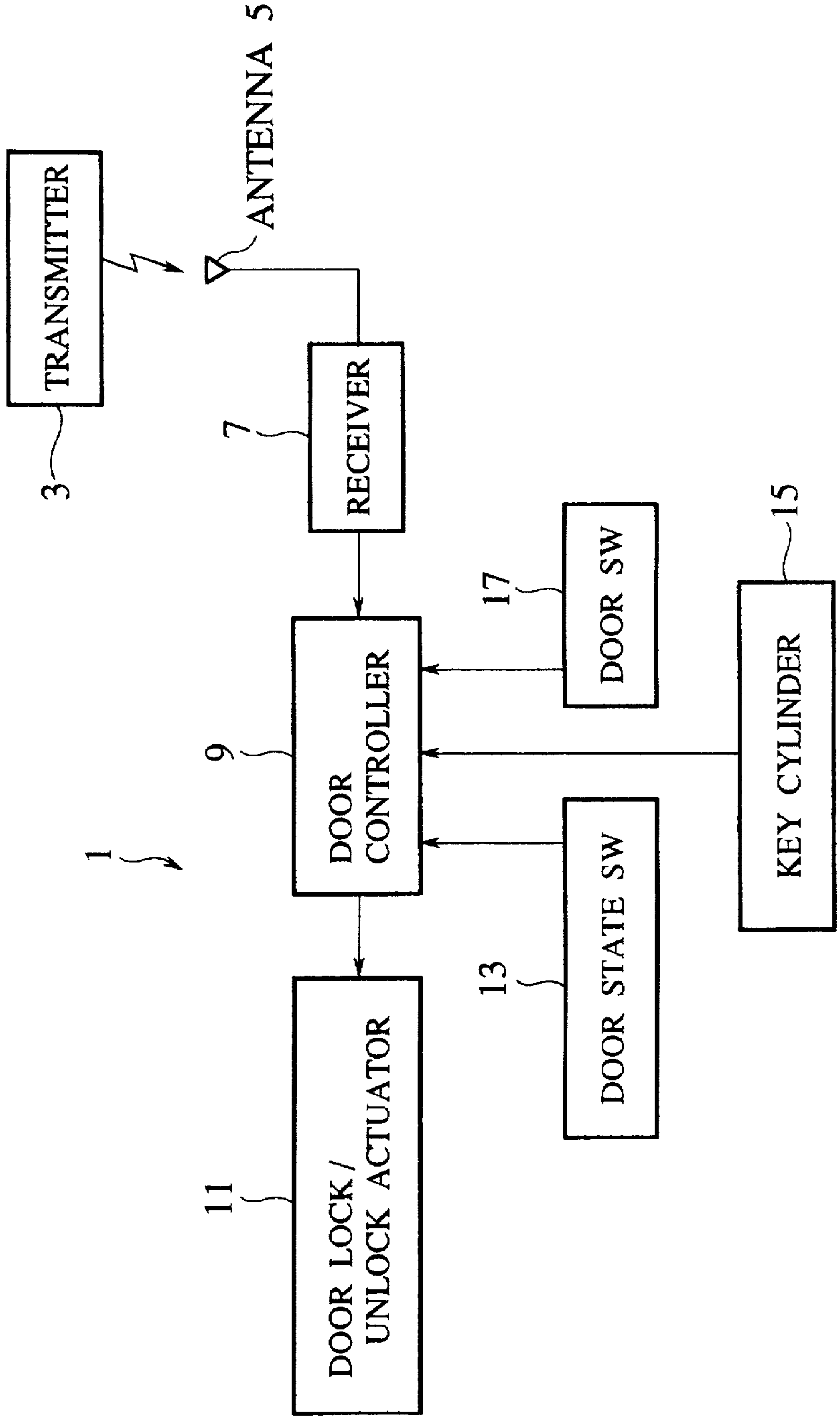
FIG. 2 is a drawing which shows a block diagram of a keyless entry unit 1 according to a first embodiment of the present invention.

FIG. 2 is a block diagram of a keyless entry unit 1 according to an embodiment of the present invention. In FIG. 2, the keyless entry unit 1 is composed of a portable transmitter 3 for commanding locking or unlocking of doors, an antenna 5 for receiving radio waves including a command signal transmitted from the transmitter 3, a receiver 7 for detecting the command signal from the received radio waves, a door control section (door controller) 9 for controlling the whole unit according to control programs and control data, a door locking/unlocking actuator (hereinafter, referred to as "a door actuator") 11 for locking or unlocking doors of a vehicle, a door state SW 13 installed in the door actuator 11 for detecting a door locked state or a door unlocked state, a key cylinder 15 provided to a console of the vehicle for detecting as to whether an ignition key 4 is inserted thereinto, and a door SW 17 provided to the chassis frame for detecting as to whether the doors are open or closed.

Figure 3A:
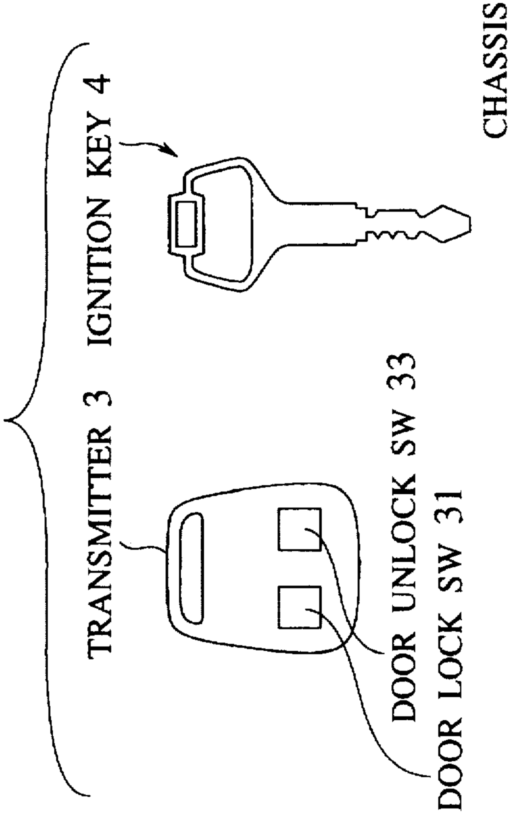
FIGS. 3A and 3B are drawings which show a positional relationship of a component of the keyless entry unit 1 in a vehicle according to the first embodiment of the present invention.

The following describes the positional relationship of the above components. In FIG. 3A, the transmitter 3 is a portable remote control key, and it has a door locking SW 31 and a door unlocking SW 33. The ignition key 4 is portable separately from the transmitter 3, and in the case where a driver gets into a vehicle (chassis frame) 20 with the ignition key 4, the driver inserts it into the key cylinder 15 of the console, and puts the key 4 to a starting position so as to start the engine. Moreover, a radio wave transmitted from the transmitter 3 is received by the antenna 5 provided to a rear window of the vehicle 20.

Figure 3B:
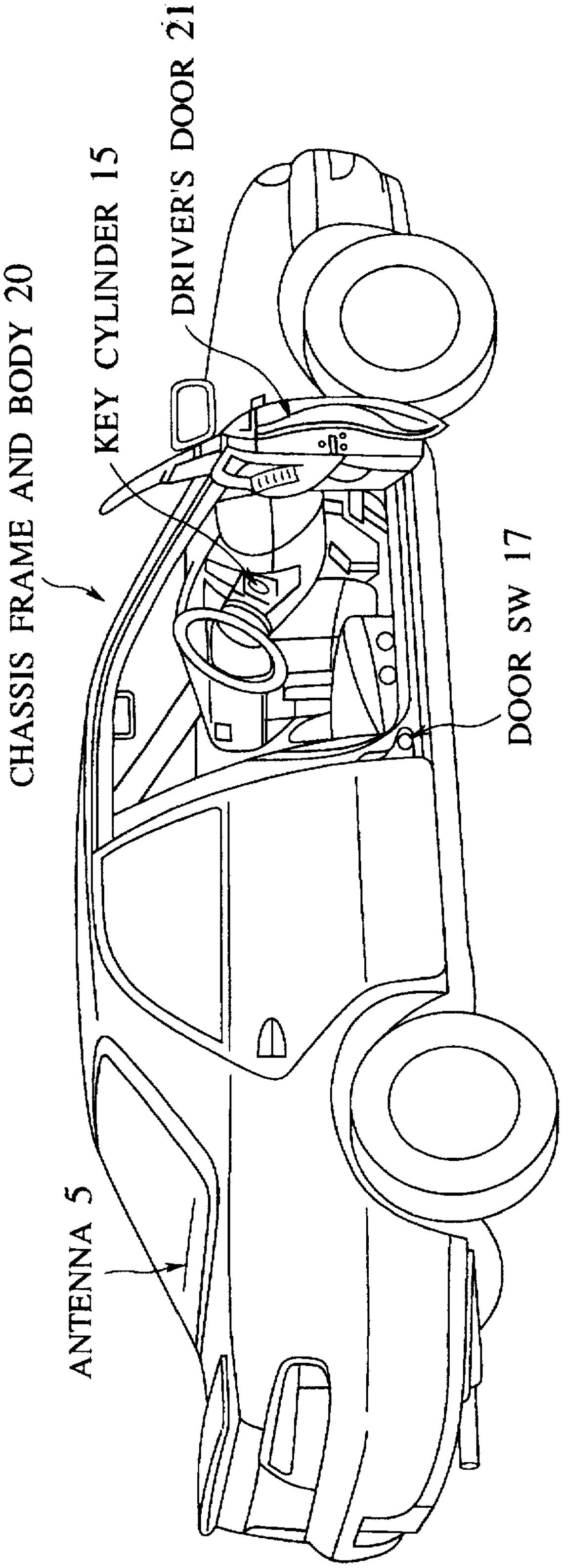

In FIG. 3B, the door SW 17 is OFF when a door 21 on a driver's seat side (hereinafter, referred to as "a driver's door 21") is closed, and the door SW 17 is ON when the driver's door 21 is open. The driver's door 21 is equipped with a door actuator 11 on its inside, and the door actuator 11 locks or unlocks the driver's door 21. Moreover, the door actuator 11 is equipped with the door state SW 13 on its inside, and the door state SW 13 detects as to whether the driver's door 21 is locked or unlocked.

Figure 4:
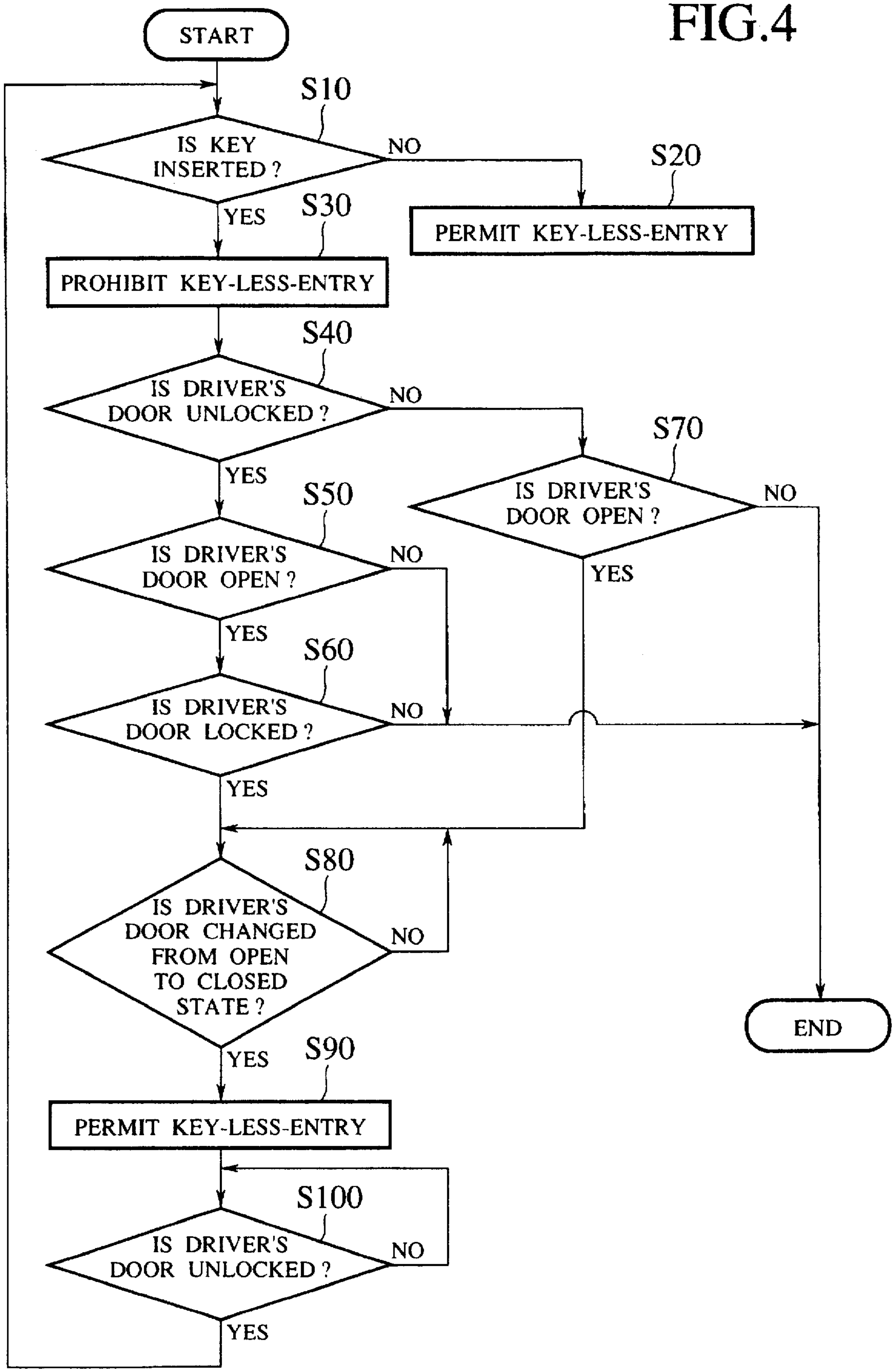
FIG. 4 is a flow chart which explains an operation of the keyless entry unit 1 according to the first embodiment of the present invention.

The following describes an operation of the keyless entry unit 1 by referring to the flow chart shown in FIG. 4.

First, a judgment is made at S10 as to whether the ignition key 4 is inserted into the key cylinder 15. When the ignition key 4 is not inserted into the key cylinder 15, the sequence goes to S20, and when the ignition key 4 is inserted into the key cylinder 15, the sequence goes to S30.

At S20, since the ignition key 4 is not inserted, allowance is flagged in an internal RAM of the door controller 9 so that the keyless entry operation is allowed. Thereafter, when an unlocking command signal, for example, is transmitted from the transmitter 3, the door actuator 11 is operated so as to unlock the doors.

Meanwhile, since the ignition key 4 is inserted at S30, the allowance is unflagged in the internal RAM of the door controller 9 so that the keyless entry operation is forbidden. Here, even if the unlocking command signal, for example, is transmitted from the transmitter 3, the doors cannot be unlocked by operating the door actuator 11.

Next, at S40, in order to make a judgment as to whether the driver's door 21 is unlocked, a judgment is made as to whether the door state SW 13 installed in the door actuator is OFF. When the door state SW 13 is OFF, the driver's door 21 is unlocked, so the sequence goes to S50. Meanwhile when the door state SW 13 is ON, the driver's door 21 is locked, so the sequence goes to S70.

At S50, in order to make a judgment as to whether the driver's door 21 is open, a judgment is made as to whether the door SW 17 provided to the chassis frame 20 is ON. When the door SW 17 is ON, the driver's door 21 is open, so the sequence goes to S60. Meanwhile, when the door SW 17 is OFF, the driver's door 21 is closed, and the sequence ends.

Next, at S60, in order to make a judgment as to whether the driver's door 21 is locked, a judgment is made as to whether the door state SW 13 installed in the door actuator 11 for the driver's door 21 is ON. When the door state SW 18 is ON, the driver's door 21 is locked, so the sequence goes to S80. Meanwhile, when the door state SW 13 is OFF, the driver's door 21 is unlocked, and so the sequence ends.

Meanwhile, at S70, in order to make a judgment as to whether the driver's door 21 is open, a judgment is made as to whether the door SW 17, provided to the chassis frame 20, is ON. When the door SW 17 is ON, the driver's door 21 is open, so the sequence goes to S80. Meanwhile, when the door SW 17 is OFF, the driver's door 21 is closed, and so the sequence ends.

Next, a judgment is made at S80 as to whether the driver's door 21 is changed from the open state to the closed state. In other words, the step S80 is repeated until an output from the door SW 17 is changed from the ON state to the OFF state.

Here, a judgment is made at S40 through S80 as to whether the driver's door 21 is shut by the driver. In other words, in the successive steps that after the driver's door 21 is opened with driver's door 21 unlocked and then the driver's door 21 is locked, and after that the driver's door 21 is changed from the open state to the closed state, the driver's door 21 is shut. Moreover, in the case that after the driver's door 21 is opened with the driver's door 21 unlocked, the driver's door 21 is changed from the open state to the closed state, the driver's door 21 is shut. In this case, the driver's door 21 is locked.

At S90, since the driver's door 21 is shut at S90, the allowance is flagged in the internal RAM of the door control section 9, and the keyless entry operation is allowed so that the state that the locking/unlocking control is forbidden according to the command signal from the transmitter 3 is canceled.

Here, the driver outside the vehicle shall realize that the driver's door 21 is locked while the ignition key 4 is in the key cylinder 15 of the vehicle. Therefore, the driver presses the door unlocking switch 33 of the transmitter 3 so that the door unlocking command signal is transmitted.

Next, at S100, in order to make a judgment as to whether the driver's door 21 is unlocked, the step S100 is repeated until the door state SW 13 is turned OFF.

When the driver's door 21 is unlocked at S100, the driver can open the door 21. Next, the sequence goes to S10 so that the following process is repeated.

Also, in the case where the driver's door 21 is opened and the driver's door 21 is shut with the ignition key 4 in the key cylinder 15, the keyless entry operation is allowed until the driver's door 21 is opened. As a result, the driver's door 21 can be unlocked by pressing the door unlocking switch 33 of the transmitter 3 by the driver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keyless entry unit for locking and unlocking at least one door of a vehicle according to a command signal which is transmitted from a portable transmitter and is received by a receiver provided for the vehicle, comprising:

key detecting means for detecting as to whether an ignition key is inserted into a key cylinder provided in the vehicle;

door state detecting means for detecting that a door of the vehicle is closed and is locked;

forbidding means for forbidding a locking/unlocking control according to a command signal from the transmitter, on the basis of a signal supplied by the key detecting means;

decision means for judging whether the doors changed from an open to a closed state with the door locked; and canceling means for canceling the forbiddance of the forbidding means, when the detection is made that the ignition key is inserted in the key cylinder and the detection is made that the door of the vehicle is closed and is locked, on the basis of a signal supplied by the decision means that the door is locked and has changed from an open state to a closed state, wherein, when the forbiddance of the forbidding means is canceled, a locked door with the ignition key being inserted in the key cylinder can be reopened by the command signal.

2. The unit of claim 1, wherein said portable transmitter is separable from the ignition key.

3. The unit of claim 1, further comprising an actuator for locking and unlocking the door.

4. The unit of claim 3, wherein said door state detecting means comprises:

a door state switch installed in the actuator for detecting a door locked state and a door unlocked state and for outputting a first signal indicative thereof;

a door switch provided to a chassis frame of the vehicle for detecting whether the door is in the closed state or the open state and for outputting a second signal indicative thereof, wherein the decision means performs the judging based on the first signal and the second signal.

5. The unit of claim 4, wherein said command signal is included in radio waves transmitted by the portable transmitter.

6. A keyless entry unit for locking and unlocking at least one door of a vehicle according to a command signal which is transmitted from a portable transmitter and is received by a receiver provided for the vehicle, comprising:

an actuator for locking and unlocking the door;

a controller connected to the actuator and the receiver for controlling an operation of the actuator;

a door state switch connected to the controller, and installed in the actuator, for detecting a door locked state and a door unlocked state, and for outputting a first signal indicative thereof;

a key cylinder connected to the controller, and provided to a console of the vehicle, for detecting an existence of an ignition key therein; and a door switch connected to the controller, and provided to a chassis frame of the vehicle, for detecting a door closed state and a door open state, and for outputting a second signal indicative thereof, wherein the controller inhibits a locking/unlocking operation upon detection of the existence of the ignition key in the key cylinder, and cancels the inhibiting by judging whether the door has changed from the door open state to the door closed state with the door in the door locked state, on the basis of the first and second signals respectively provided by the door state switch and the door switch.

7. The unit of claim 6, wherein the judgment of whether the door has changed from the door open state to the door closed state with the door in the door locked state comprises a sequence of following judgments:

a) a first judgment as to whether the door is in the door locked state or the door unlocked state;

b) a second judgment as to whether the door is in the door open state or the door closed state;

c) a third judgment as to whether the door is in the door locked state or the door unlocked state; and d) a fourth judgment as to whether the door has changed from the door open state to the door closed state.

8. The unit of claim 7, wherein said receiver has an antenna for receiving radio waves including said command signal transmitted from the transmitter.

9. The unit of claim 7, wherein the controller no longer inhibits the locking/unlocking operation when the door locked state is judged by the first judgment, the door open state is judged by the second judgment, the door locked state is judged by the third judgment, and the change from the door open state to the door closed state is confirmed by the fourth judgment.

10. The unit of claim 7, wherein the controller continues to inhibit the locking/unlocking operation when the door locked state is judged by the first judgment, and the door closed state is judged by a fifth judgment which follows the first judgment.

11. The unit of claim 6, wherein said portable transmitter is separable from the ignition key.

12. The unit of claim 7, wherein said portable transmitter is separable from the ignition key.

13. A method of providing keyless entry for a vehicle, comprising the steps of:

a) detecting whether an ignition key is present within an ignition chamber of the vehicle;

b) permitting keyless entry of the vehicle via a remote control device if the detection in step a) indicates that ignition key is not present, and prohibiting the keyless entry of the vehicle via the remote control device if the detection in step a) indicates that the ignition key is present;

c) if the detection in step a) indicates that the ignition key is present, performing the following additional steps:

c1) determining whether a driver's-side door of the vehicle is in an unlocked state or a locked state;

c2) if the determination in step c1) indicates that the driver's-side door is in the locked state, c21) determining whether the driver's-side door is in an open state or a closed state;

c22) if the determination in step c21) indicates that the driver's-side door is in the closed state, maintaining the prohibition of the keyless entry of the vehicle via the remote control device;

c23) if the determination in step c21) indicates that the driver's-side door is in the open state, c231) detecting whether the driver's-side door has changed from the open state to the closed state, and if so, permitting the keyless entry of the vehicle via the remote control device;

c3) if the determination in step c1) indicates that the driver's-side door is in the unlocked state, c31) determining whether the driver's-side door is in the open state or the closed state;

c311) if the determination in step c31) indicates that the driver's-side door is in the closed state, maintaining the prohibition of the keyless entry of the vehicle via the remote control device;

c312) if the determination in step c31) indicates that the driver's-side door is in the open state, determining whether the driver's-side door is in the locked state or the unlocked state;

c3121) if the determination in step c3122) indicates that the driver's-side door is in the unlocked state, maintaining the prohibition of the keyless entry of the vehicle via the remote control device;

c3122) if the determination in step c312) indicates that the driver's-side door is locked, detecting whether the driver's-side door has changed from the open state to the closed state, and if so, permitting the keyless entry of the vehicle via the remote control device.

* * * * *